Dec. 22, 1953  S. F. BASHARA  2,663,751
WATER REPLENISHING DEVICE FOR STORAGE BATTERIES
Filed Nov. 18, 1950
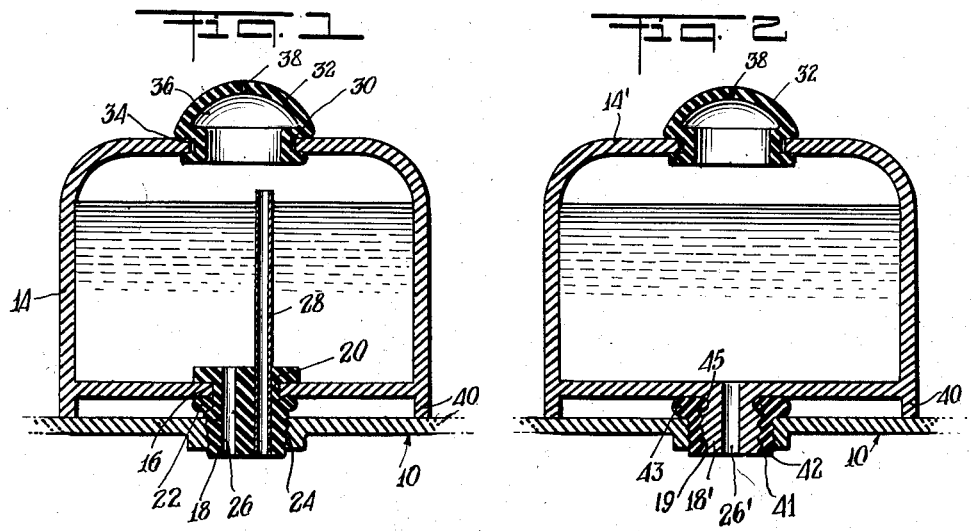
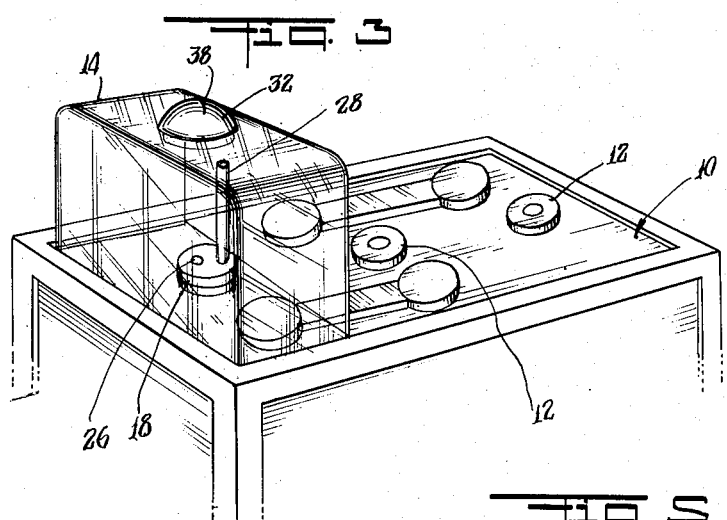
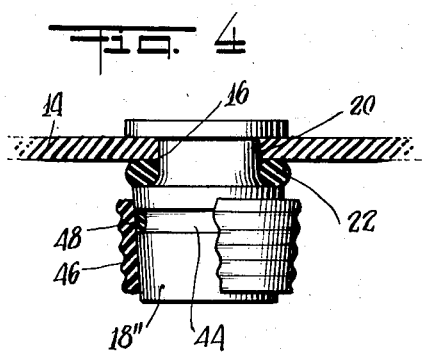
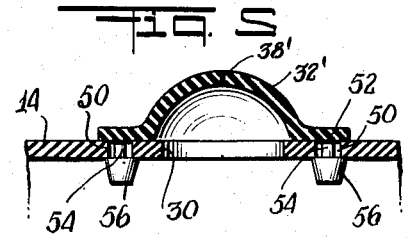
INVENTOR.
Samuel F. Bashara
BY
Charles E. Lightfoot
ATTORNEY Patented Dec. 22, 1953

2,663,751

UNITED STATES PATENT OFFICE 2,663,751

WATER REPLENISHING DEVICE FOR STORAGE BATTERIES

Samuel F. Bashara, Houston, Tex.

Application November 18, 1950, Serial No. 196,404

4 Claims. (Cl. 136—162)

1

This invention relates to a combined acid trap and water replenishing device for storage batteries, and more particularly to a device adapted to hold a supply of water for replenishing the fluid in a storage battery, which device also operates as a trap to prevent the escape of acid or gas from the battery.

The invention hereinafter shown and described is a continuation-in-part of the invention of the same applicant, disclosed in pending application Serial No. 170,000, filed June 23, 1950, now abandoned.

Storage batteries, and especially those which are commonly used in motor vehicles, are provided with vented caps, which must be removed for the purpose of replenishing the water evaporated from the cells, and such batteries present the disadvantage that acid and gases frequently escape through the caps resulting in corrosion of the surrounding parts of the vehicle, as well as producing an undesirable wet condition of the exterior of the battery inducive to the adherence of deleterious substances thereto. In replenishing the water in such batteries it also frequently happens that water is spilled on the top of the battery, or the cells of the same are overflowed, thus increasing the undesirable accumulation of corrosive material to further corrode the surrounding parts.

Another object of the invention is the provision of a water replenishing device for storage batteries by the use of which frequent inspection of the condition of the battery cells is made unnecessary, and whereby the amount of water available to replenish the cells can be readily seen.

A further object of the invention is to provide a water replenishing device for storage batteries which is easily applied to batteries of all kinds, and which will be securely maintained in position at all times.

A still further object of the invention is the provision of a device of the character referred to which is of simple design and rugged construction, easily removed and replaced on the battery, and which may be refilled when necessary without opening the device or removing the closure therefrom.

The above and other objects and advantages of the invention will be apparent from a consideration of the following detailed description, constituting a specification of the same, when taken in conjunction with the annexed drawings wherein—

Figure 1 is a vertical cross-sectional view of a preferred form of the invention;

2

Figure 2 is a view similar to that of Figure 1, illustrating a somewhat different form of the invention;

Figure 3 is a perspective view of the invention in position on a storage battery;

Figure 4 is a fragmentary view, partly broken away and partly in cross section, showing a somewhat modified form of the plug used in the invention by which the same is applied to the battery; and Figure 5 is a fragmentary cross-sectional view showing a modified form of closure cap used in the invention.

Referring now to the drawings in greater detail, the numeral 10 designates a storage battery of conventional design, whose cells are each provided with the customary filling openings closed by screw caps 12 or other conventional closures. In the present illustration the closures 12 may be removed from the battery cells, and the invention is applied to the battery by inserting the same in the openings, so that the replenishing device rests upon the top of the battery.

The combined trap and replenishing device comprises in its preferred form, a container 14, which in the present illustration is of generally rectangular configuration, and conveniently formed of suitable transparent material, such as glass, plastic or the like. The container has a centrally located bottom opening 16, into which a plug 18 is fitted, this plug being formed with an annular exterior groove 20 adapted to receive the marginal portion of the container surrounding the opening 16, and into which groove the retainer ring 22, such as an O-ring is fitted to retain the plug in the opening and form therewith a fluid type seal with the container. The plug is preferably formed of relatively resilient material, such as rubber or the like, whereby the same may be inserted through the opening 16 in the container to substantially fill the opening. The lower end portion of the plug may be tapered to fit snugly into the battery opening in engagement with the customary internal threads 24 thereof.

An opening 26 extends through the plug 18 whereby water from the container may enter the cell of the battery, and a tubular member 28 passes through the plug and extends upwardly within the container to a point near the top thereof, for the escape of gases which may be formed in the cell during the charging and discharging of the same.

In the top of the container 14 there is an opening 30, which is closed by a cap 32. This cap is preferably formed of flexible material, such as rubber, or the like, and is provided with an external groove 34, adapted to receive the marginal portion of the container surrounding the opening 30 to form a fluid type seal therewith. The cap is so constructed as to be readily inserted in the opening 30, and is hollow on the interior, as indicated at 36. The upper wall of the cap 32 is upwardly arched and provided with a small slit 38 to relieve any pressure developed in the container, but which is closed against the entrance of air into the container from the outside. The slit 38 also forms a means for the insertion through the cap of filling means, such as a syringe or the like for replacing water in the container.

The container may be formed with a downwardly extending rim 40, which may also take the form of spaced legs or the like, adapted to rest on the upper surface of the battery when the container is in position thereon.

Constructed as described above the container may be applied to the battery by inserting the plug 18 in the cell opening to secure the container on top of the battery in communication with the interior of the cell. Water may then be introduced into the container through the slit 38 in the cap 32, and will enter the cell through the opening 26 in the plug. The tube 28 in the plug permits the escape of any gas formed in the cell, so that the entrance of water from the container into the cell is not obstructed by the formation of any gas pockets in the cell. It will also be appreciated that any acid escaping from the cell through the tube 28 will be retained in the container and absorbed by the water therein, and will not be able to escape from the container to corrode surrounding parts of the vehicle.

In the form of the invention illustrated in Figure 2 the container 14' may be formed integrally, by molding, casting, or other similar process, so that the plug portion 18' is formed as a part of the container, rather than as a separate piece. The plug portion may be externally threaded, as at 19, and means may be provided to adapt the same to the battery opening. In this case a sleeve 42, of resilient material, such as rubber or the like, is positioned about the plug portion 18' in order to form a tight seal between the threads 24 of the battery opening and the plug portion, when the container is applied to the battery. The upper end of the sleeve 42 may have an enlarged bead 43 thereon, which is received in an annular groove 45 about the plug 18' for securing the sleeve in place thereon. The plug portion 18' is provided with an opening 26' therethrough for the admission of water from the container into the battery cell, and if desired may also have a tube therethrough similar to the tube 28 in the previously described form of the invention, for passage of gases from the cell into the container and the container 14' is also provided with a closure cap 32 having the same opening 38 therein as in the previously described form, which cap is applied to the container as previously described.

In other respects the container 14' is similar to the container 14 previously described.

In Figure 4 there is shown a somewhat modified form of plug arrangement used with the replenishing device. In this form of the invention the plug 18'' is applied to the container in the same manner as illustrated in Figure 1, but is formed with an exterior annular groove 44 in its tapered portion. A resilient sleeve 46 is positioned over the tapered portion of the plug said resilient sleeve having an internal rib 48 which fits into the groove 44 of the plug to securely retain the sleeve thereon. It will readily be appreciated that the sleeve 46 may be of any desired thickness, and sleeves of various diameters may be employed, whereby a single size of plug may be used for a wide range of different sized battery openings, so that the replenishing device may be used on batteries of different types, without otherwise modifying its structure. In other respects the plug arrangement of Figure 4 is identical with that previously described in connection with Figure 1, having the same annular groove 16 to receive the marginal portion of the container surrounding the opening 20 therein, and provided with an O-ring 22 which fits into the groove 16 to form a tight seal between the plug and the container.

Figure 5 of the drawing illustrates a somewhat modified form of closure cap for the container which takes the form of an upwardly concave cap 32', having downwardly extending projections thereon, which fit through openings 50 in the top of the container. The marginal portion 52 of the cap is preferably flat and fits against the outer surface of the container surrounding the opening 30 therein, and the downward projections are formed with neck portions 54, of smaller diameter than the openings 50. The downwardly extending projections are also formed with enlargements 56, which are slightly greater in diameter than the openings 50 and are tapered for ready insertion therethrough. By pressing the enlargements 56 through the openings 50 it will be readily apparent that the cap 32' will be securely retained in position over the opening 30. The cap 32' has a slit 38' similar to the slit 38 previously described and for the same purpose.

It will thus be seen that the invention as described above provides a convenient trap and water replenishing device of simple design, which is readily adaptable for use with storage batteries of different types, and which may be easily applied to batteries having widely varying sizes of cell openings. The invention also performs the important function of entrapping and conserving the acid in the battery cells, making unnecessary to frequently replace the same and prolonging the useful life of the cells.

The invention is disclosed herein in connection with certain specific structural embodiments, but it will be understood that these are intended to be illustrative only, and that numerous changes in the construction and arrangement of the various parts may be made without departing from the spirit of the invention or the scope of the appended claims.

What is claimed and desired to secure by Letters Patent is:

1. A combined acid trap and water replenishing device for storage batteries comprising a container having a bottom outlet a plug formed of resilient material closing said outlet and extending beyond the bottom of the container for insertion in an opening in a storage battery to close said opening, said plug having an exterior annular groove adapted to receive the marginal portion of the container surrounding said bottom outlet, resilient means in said groove forming a seal between said marginal portion of the container and said plug, said plug having a passageway therethrough in communication with the interior of the container and battery, and vent means in the container remote from said passageway and closing said container against inflow of air into the container, said vent means being operable by an increase in pressure within said container above atmospheric pressure to open the container to outflow of gas therefrom.

2. A combined acid trap and water replenishing device for storage batteries comprising a container having a bottom outlet, a plug formed of resilient material closing said outlet and extending beyond the container for insertion in an opening in a storage battery to close said opening, said plug having an external annular groove adapted to receive the marginal portion of the container surrounding said bottom outlet, resilient means in said groove forming a seal between said marginal portion of the container and said plug, said plug having a passageway therethrough in communication with the interior of the container and battery, means carried by the plug for delivering gas from the battery to the container, said means terminating in the container above the bottom thereof, said container also having a top filling opening, and a resilient cap closing said filling opening, said cap having an upwardly arched upper wall portion having a slit therethrough, said wall portion being responsive to pressure outside of the container to close said slit and being responsive to an increase in pressure within the container above atmospheric pressure to open said slit.

3. A combined acid trap and water replenishing device for storage batteries comprising a container having a bottom outlet a plug closing the outlet and extending beyond the container, said plug having an external annular groove adapted to receive the marginal portion of the container surrounding said outlet, resilient means in said groove forming a seal between said marginal portion of the container and said plug, resilient means surrounding said plug and adapted to form a seal between the plug and an opening in a storage battery to close said opening when the plug is inserted therein, said plug having a passageway therethrough in communication with the container and the battery, and vent means in the top of the container and including a body of resilient material having a slit therethrough and responsive to the pressure of the atmosphere outside said container to close said slit and to an increase in pressure in the container above atmospheric pressure to open said slit.

4. A combined acid trap and water replenishing device for storage batteries comprising a container having a bottom outlet, a plug closing the outlet and extending beyond the container, said plug having an external annular groove, resilient means surrounding the plug and extending into said groove and adapted to form a seal between the plug and an opening in a storage battery to close said opening when the plug is inserted therein, said plug having a passageway therethrough in communication with the container and the battery, and vent means in said container said vent means including a body of resilient material having a slit therethrough, said body being responsive to the pressure of the atmosphere exteriorly of the container to close said slit against entrance of air into the container and to an increase in pressure in the container above atmospheric pressure to open said slit.

SAMUEL F. BASHARA.

References Cited in the file of this patent

UNITED STATES PATENTS

| Number | Name | Date |
|---|---|---|
| 1,909,836 | Kline | May 16, 1933 |
| 2,339,642 | Le Gro et al. | Jan. 18, 1944 |
| 2,516,084 | Wells | July 18, 1950 |

FOREIGN PATENTS

| Number | Country | Date |
|---|---|---|
| 517 | Great Britain | Oct. 31, 1907 |
| 659,787 | France | Feb. 11, 1929 |
| 551,867 | Great Britain | Mar. 12, 1943 |